(12) United States Patent
Zekavica et al.

(10) Patent No.: US 9,027,225 B2
(45) Date of Patent: May 12, 2015

(54) METHOD OF FORMING ONE PIECE BACK FRAME FOR A VEHICLE SEAT

(75) Inventors: Ornela Zekavica, Novi, MI (US); Miodrag Mitch Petrovich, Ann Arbor, MI (US); Atsushi Nakashima, Kanagawa-ken (JP)

(73) Assignee: Johnson Controls Technology Company, Holland, MI (US)

( * ) Notice: Subject to any disclaimer, the term of this patent is extended or adjusted under 35 U.S.C. 154(b) by 7 days.

(21) Appl. No.: 13/993,786

(22) PCT Filed: Dec. 21, 2011

(86) PCT No.: PCT/US2011/066444
§ 371 (c)(1),
(2), (4) Date: Aug. 15, 2013

(87) PCT Pub. No.: WO2012/088252
PCT Pub. Date: Jun. 28, 2012

(65) Prior Publication Data
US 2013/0328375 A1 Dec. 12, 2013

Related U.S. Application Data (60) Provisional application No. 61/425,436, filed on Dec. 21, 2010.

(51) Int. Cl.
| | | |
|---|---|---|
| B23P 11/00 | (2006.01) |
| B60N 2/68 | (2006.01) |
| B60N 2/48 | (2006.01) |
| B60N 2/42 | (2006.01) |
| B21D 39/02 | (2006.01) |

(52) U.S. Cl.
CPC ............ *B60N 2/68* (2013.01); *B21D 39/028* (2013.01); *B60N 2/4808* (2013.01); *B60N 2/682* (2013.01); *B60N 2002/4897* (2013.01); *B60N 2/4207* (2013.01)

(58) Field of Classification Search
CPC ............ B60N 2/68; A47C 7/40; A47C 7/38; B21D 39/028; B21D 39/02
USPC ................ 29/525.14, 557; 297/452.18
See application file for complete search history.

(56) References Cited

U.S. PATENT DOCUMENTS

| | | |
|---|---|---|
| 1,001,833 A | 8/1911 | Frame et al. |
| 4,373,369 A | 2/1983 | Schey |
| 4,712,512 A | 12/1987 | Schreib et al. |
| 5,660,443 A | 8/1997 | Pedronno |
| 5,749,135 A | 5/1998 | Crane et al. |
| 6,386,638 B1 | 5/2002 | Strauch |
| 7,255,400 B2 | 8/2007 | Holdampf |

*Primary Examiner* — Jermie Cozart
(74) *Attorney, Agent, or Firm* — Dickinson Wright PLLC (57) ABSTRACT

A one-piece back frame including an upper portion, a lower portion and a pair of vertical portions. The upper portion includes a first flange bent downwardly and a second flange bent upwardly to enclose the upper portion. The first and second flanges are brazed or welded to one another, which has the effect of strengthening the upper portion of the back frame and increasing its resistance to forces and moments during front or rear impact. Additionally, a pair of tubes extend through and are connected to upper portion. The tubes are designed for receiving a head restraint, but also serve the additional purpose of further strengthening the upper portion to increase its resistance to forces and moments during front or rear impacts.

9 Claims, 8 Drawing Sheets

METHOD OF FORMING ONE PIECE BACK FRAME FOR A VEHICLE SEAT

CROSS-REFERENCE TO PRIOR APPLICATION

This U.S. National Stage Patent Application claims the benefit of International Application serial number PCT/US2011/066444 filed Dec. 21, 2011, entitled "One Piece Back Frame For A Vehicle Seat" and U.S. Provisional Patent Application Ser. No. 61/425,436 filed Dec. 21, 2010, entitled "One Piece Back Frame For A Vehicle Seat," the entire disclosures of the applications being considered part of the disclosure of this application, and hereby incorporated by reference.

BACKGROUND OF THE INVENTION

1. Field of the Invention

The present disclosure relates generally to the field of vehicle seating. More specifically, this disclosure relates to a back frame for a vehicle seat.

2. Brief Description of the Related Art

Vehicle seats generally include a lower structure joined a back frame coupled together with a recliner mechanism. A foam core and a trim cover, typically of a fabric or a leather material, are disposed around the lower and back frames for supporting a passenger in the vehicle.

Figure 1:
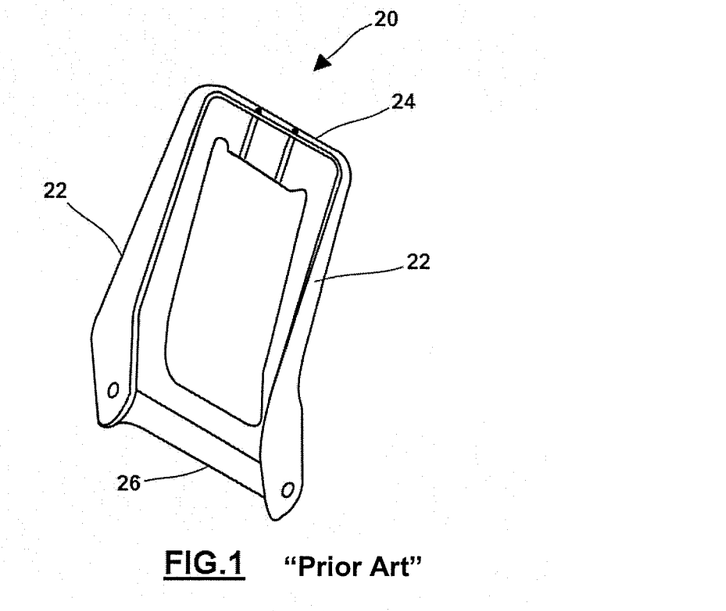
FIG. 1 is a perspective view of a back frame.

FIG. 1 is a perspective view of one type of a back frame 20 for a vehicle seat. The back frame 20 includes a pair of vertical sections 22 interconnected by a horizontally extending upper section 24 and a horizontally extending lower section 26. The upper and lower sections 24, 26 extend in spaced and approximately parallel relationship with one another. Although not shown in FIG. 1, a head restraint for supporting the head of the passenger is generally attached to the top of the upper section 24 of the back frame 20.

Figure 2:
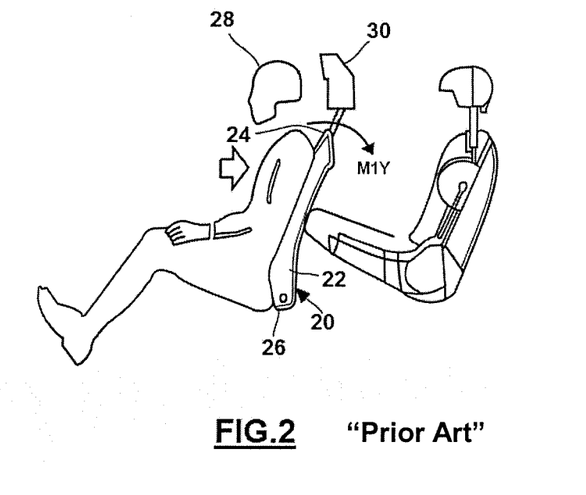
FIG. 2 is a side view of a known back frame supporting a passenger during a rear impact.

FIG. 2 is a side view of a back frame 20 in an automobile during a rear end collision, or a rear impact. As shown, the back frame 20 is disposed in a seat in the front row of a passenger vehicle and supporting the back of a first row passenger 28. A head restraint 30 extends upwardly from the upper section 24 of the back frame 20 to support the head of the first row passenger 28. As illustrated with an arrow, the rear end collision causes the head of the first row passenger 28 to impart a longitudinally backward force (F1) on the head restraint 30, creating whiplash in the neck of the first row passenger 28. This backward force (F1) creates a moment (M1y) about an axis running through the upper section 24 of the back frame 20. The upper section 24 of the back frame 20 must withstand this moment (M1y), i.e. the upper section 28 must be torsionally rigid enough to prevent relative movement of the head of the first row passenger 28, or to prevent whiplash.

Figure 3:
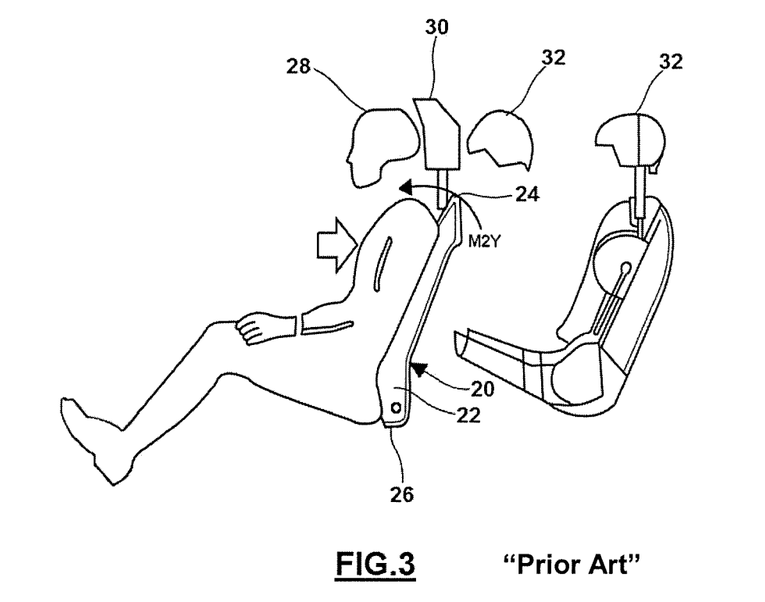
FIG. 3 is a side view of a known back frame supporting a passenger during a front impact.

FIG. 3 is a side view of a back frame 20 in an automobile that is experiencing a front end collision, or a front impact. As shown, the back frame 20 is disposed in the front row of the automobile and supporting the back of a first row passenger 28. A head restraint 30 extends upwardly from the upper section 24 of the back frame 20. Additionally, a second passenger 32 is disposed in a back row of the automobile, seated behind the back frame 20 in the front row. As illustrated with an arrow, the head of the second passenger 32 imparts a large longitudinal forward force (F2) on the head restraint 30 of the back frame 20 in the front row. This forward force (F2) creates a moment (M2y) about an axis running through the upper section 24 of the back frame 20. The direction of the moment (M1y) from the rear end collision is opposite the direction of the moment (M2y) from the front end collision. The upper section 24 of the first row back frame 20 has to comply with certain torsional rigidity requirements that support the safety of the second row occupant during a front impact.

Figure 4:
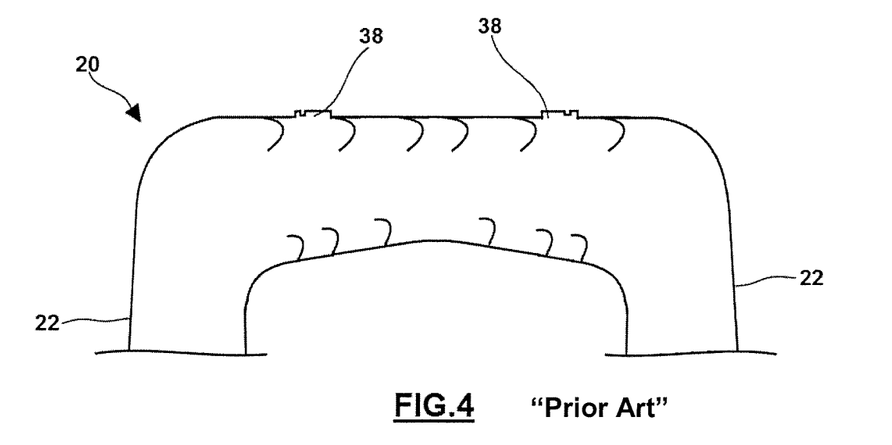
FIG. 4 is a front view of the upper section of the known back frame and including a U-channel bracket.
Figure 5:
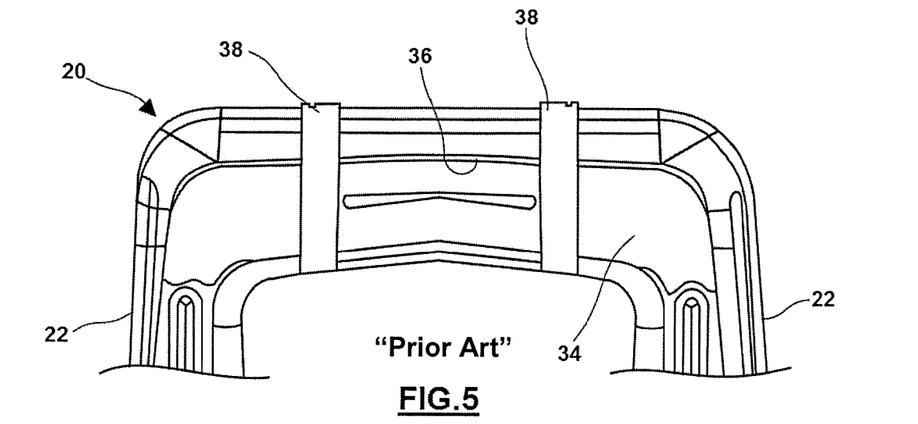
FIG. 5 is a back view of the upper section of the known back frame.

Various reinforcements have been developed to ensure that the upper section 24 of the back frame 20 withstands even the most violent collisions. One way to reinforce the upper section 24 of the back frame 20 is shown in the back frame 20 of FIGS. 4 and 5. FIG. 4 is a front view of the back frame 20 and FIG. 5 is a rear view of the back frame 20. In this example, a U-channel bracket 34 is disposed in a U-shaped channel 36 in the upper section 24 of the back frame 20. The U-shaped channel 36 and U-channel bracket 34 each extend horizontally between the vertical sections 22 of the back frame 20. Additionally, a pair of spaced tubes 38 extend vertically through the U-shaped channel 36 of the upper section 24 of the back frame 20 for supporting the head restraint 30. Joints (not shown) are required to connect the tubes 38 to the U-channel bracket 34 and to connect the U-channel bracket 38 to the U-shaped channel 36. Each of these parts, i.e. the U-channel bracket 34 and the joints, adds to the cost and manufacturing complexity of the back frame 20.

There remains a significant and continuing need for back frames for vehicle that are both cost effective and strong enough to withstand the moments that are applied to the back frame during front or rear impacts.

SUMMARY OF THE INVENTION

One aspect of the subject invention is for a one-piece back frame having a reinforced upper portion. The back frame has a generally rectangular shape with an upper portion, a lower portion, a pair of vertical portions and an open center. The upper portion includes at least one flange bent and secured to another area of the upper portion to enclose the upper portion. This has the effect of strengthening the upper portion to resist front and rear impacts without requiring any additional components which could otherwise increase the cost of the back frame.

According to another aspect of the invention, the back frame also includes at least one extending through the upper portion of the back frame. The tube both receives a head restraint and also further strengthens the upper portion to resist forces from front or rear impacts.

Another aspect of the invention is for a method of forming a back frame for a vehicle seat. The method starts with the step of providing a blank of a formable material. The method continues with the step of shaping the blank to present an upper portion, a lower portion, a pair of vertical portions and a center portion all integrally connected together. The method continues with the step of cutting the center portion to define a flange integrally connected to the upper portion and extending downwardly therefrom. The method then proceeds with the step of bending the flange to enclose the upper portion. Next, the method includes the step of securing the flange to another portion of the upper portion.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF A PREFERRED EMBODIMENT

Figure 6:
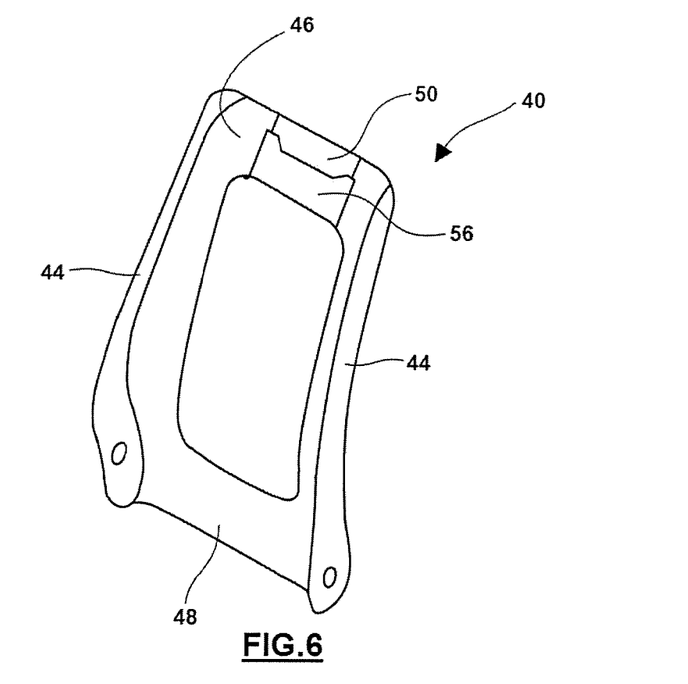
FIG. 6 is a perspective view of a back frame constructed according to one aspect of the subject invention.

Referring to the Figures, wherein like numerals indicate like or corresponding parts throughout the several views, a back frame 40 for a vehicle seat constructed according to one aspect of the invention is generally shown in FIG. 6. The back frame 40 is preferably for use in a front row seat of a passenger vehicle, such as a car, a van, a truck, or a sport utility vehicle. However, it will be appreciated that the back frame 40 could find uses in other types of vehicles including, for example, airplanes, trains, or busses.

Figure 12:
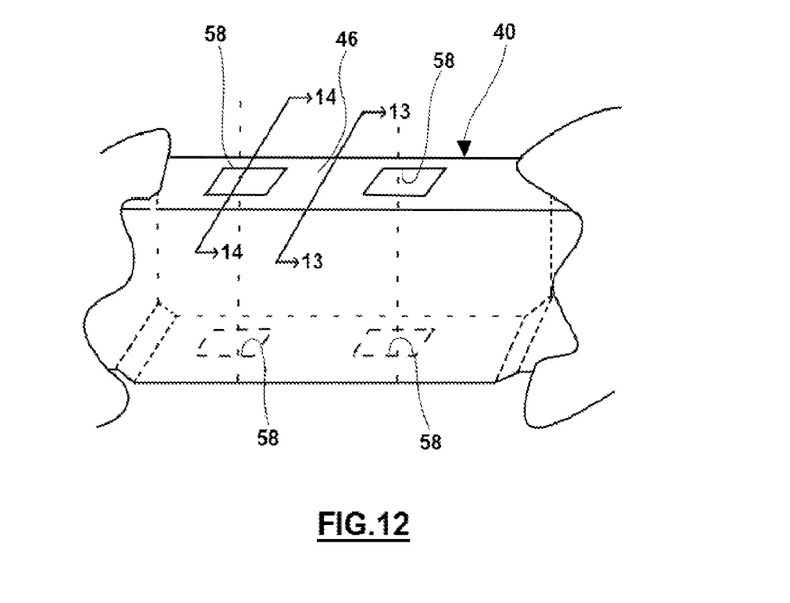
FIG. 12 is another perspective and fragmentary view of the exemplary upper section.
Figure 13:
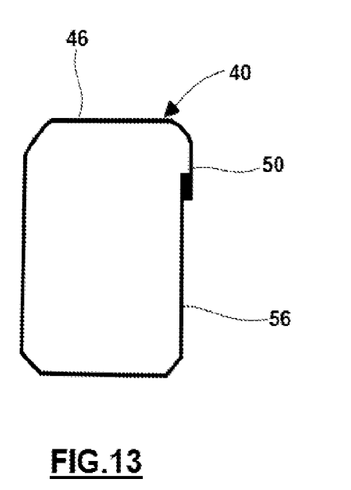
FIG. 13 is a cross-sectional view of the exemplary upper section taken along Line 13-13 of FIG. 12.
Figure 14:
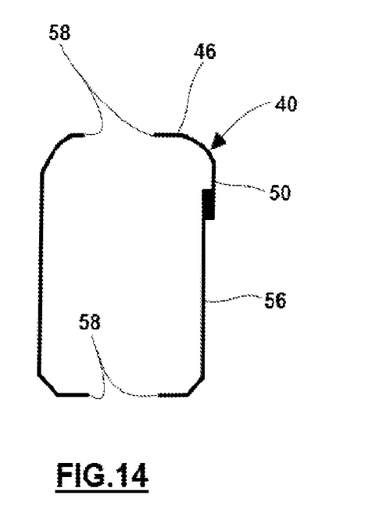
FIG. 14 is a cross-sectional view of the exemplary upper section taken along Line 14-14 of FIG. 12.

The back frame 40 includes an upper portion 46, a lower portion 48 and a pair of vertical portions 44 arranged to present a generally rectangular shape with an open center. Each of the portions 44, 46, 48 has a generally U-shaped cross-section including a base and a pair of legs extending outwardly therefrom to define a channel. Referring now to FIG. 12, the upper portion 46 includes a first flange 50 bent downwardly and a second flange 56 bent upwardly. The first and second flanges 50, 56 are secured to one another, preferably through welding or brazing, to enclose the channel in the upper portion 46 of the back frame 40. The connection between the first and second flanges 50, 56 has the effect of strengthening the upper portion 46 of the back frame 40 such that it is strong enough to withstand the moments that are applied to the upper portion 46 during front or rear impacts.

Figure 15:
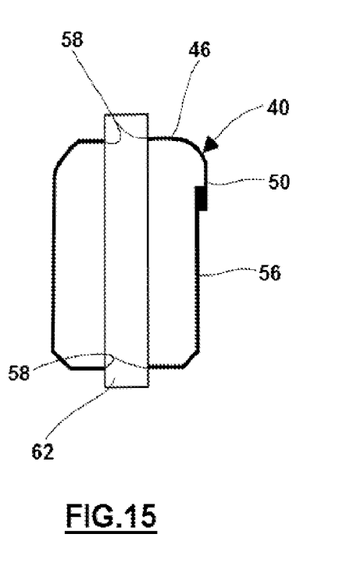
FIG. 15 is another cross-sectional view of the exemplary upper section taken along Line 14-14 of FIG. 12 and including a tube inserted into each of the holes.
Figure 16:
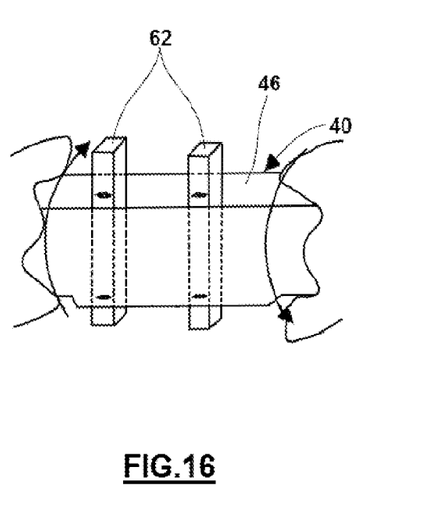
FIG. 16 is a perspective view of the exemplary upper section and including a pair of tubes being inserted into the holes.
Figure 17:
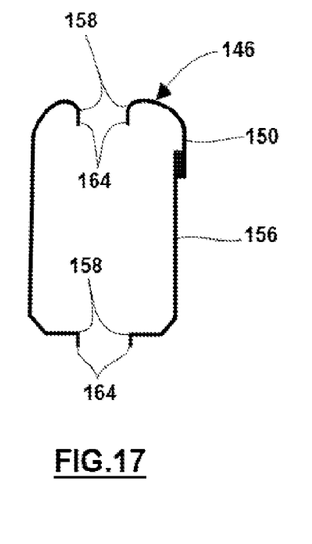
FIG. 17 is a cross-sectional view of an alternate upper section.
Figure 18:
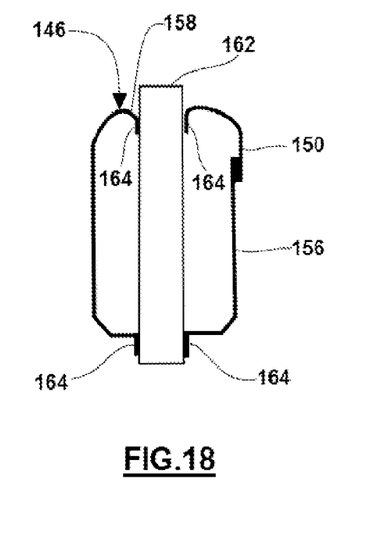
FIG. 18 is another cross-sectional view of the alternate upper section and including a pair of tubes being inserted into the holes.

Referring now to FIG. 15, a plurality of holes 58 are formed in the upper portion 46 of the back frame 40, and a tube 62 extends through each of the holes 58. The tubes 62 could be attached to the upper portion 46 through, for example, a mechanical lock, welding, brazing, etc. These holes 58 could be formed through cutting, punching, or any desirable process. The tubes 62 are shaped and spaced for receiving and attaching a head restraint to the back frame 40, but because they are joined to both the top and the bottom of the upper portion 46, they also have the effect of strengthening the upper portion 46 for withstand moments that are applied thereto during front or rear impacts.

Figure 19:
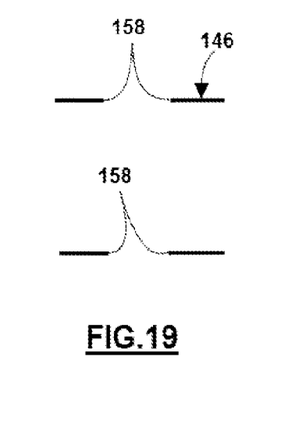
FIG. 19 is a cross-sectional view of the alternate upper section taken from a different vantage point than FIGS. 17 and 18.

Referring now to FIG. 19, an alternate embodiment of the holes 158 in the upper portion 146 is shown. The alternate holes 158 each include a pair of opposing tabs 164 extending downwardly to provide a generally flat surface for brazing or welding to the tubes 162. The generally flat surface improves the bond between the upper portion 146 and the tubes 162. As discussed above, in addition to receiving the head restraint, the tubes 162 have the additional effect of strengthening the upper portion 46 of the back frame 40.

Figure 7:
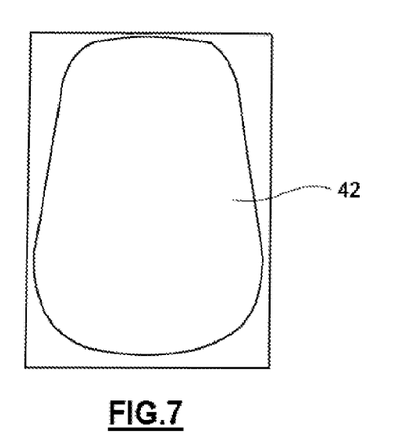
FIG. 7 is a front view of a blank of the exemplary embodiment.

Another aspect of the invention provides for a method of forming a back frame 40. The method starts with the step of providing a blank 42 of a formable material. Referring now to FIG. 7, the blank 42 is preferably of 0.8 mm thick sheet metal, such as AHSS-Dual Phase steel. However, it should be appreciated that the blank 42 could be of a range of different metals or other formable materials and could have any desirable thickness.

Figure 8:
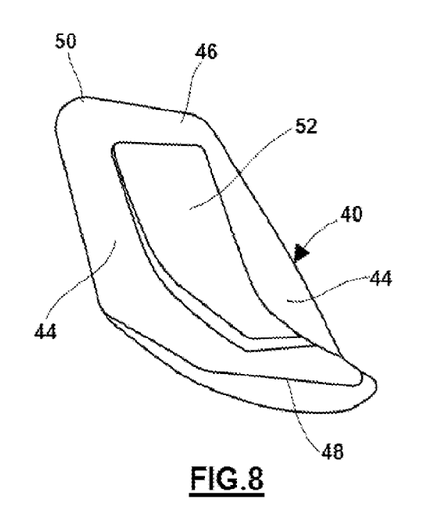
FIG. 8 is a perspective view of the exemplary back frame after a sheet metal drawing step and including a first flange and a center portion.

The method continues with the step of shaping the blank to present an upper portion 46, a lower portion 48 and a pair of vertical portions 44. The shaping step is preferably a sheet metal drawing process. However, it should be appreciated that any other type of bending or shaping process could alternately be employed. The back frame 40 after the shaping step is shown in FIG. 8. At this stage, the back frame 40 also includes a first flange 50 extending generally upwardly from the upper portion 46. Additionally, the back frame includes a rectangularly shaped center portion 52 between the vertical, upper, and lower sections 44, 46, 48.

Figure 9:
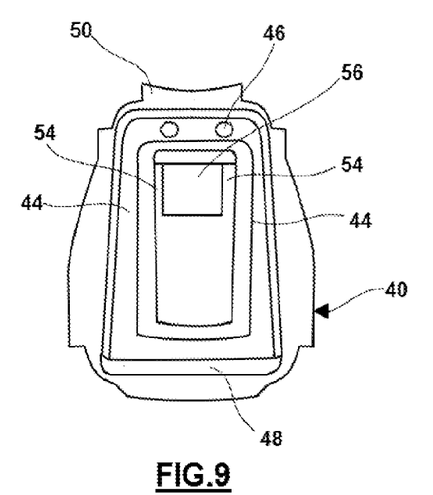
FIG. 9 is a front view of the exemplary back frame with the center portion being cut to define a second flange.

The method then continues with the step of cutting the center portion 52 to present a second flange 56. As shown in FIG. 9, in the exemplary embodiment, the majority of the center portion has been removed and the second flange 56 extends only part of the distance between the upper and lower portions 46, 48. Additionally, a pair of spaced and parallel slits 54 are cut into the remainder of the center portion. The slits 54 extend to the upper portion 46 of the back frame 40 to define the sides of the second flange 56 and to allow the second flange 56 to be bent independently of the remainder of the back frame 40. The removed segments of the center portion 52 are preferably recycled for other uses.

Figure 10:
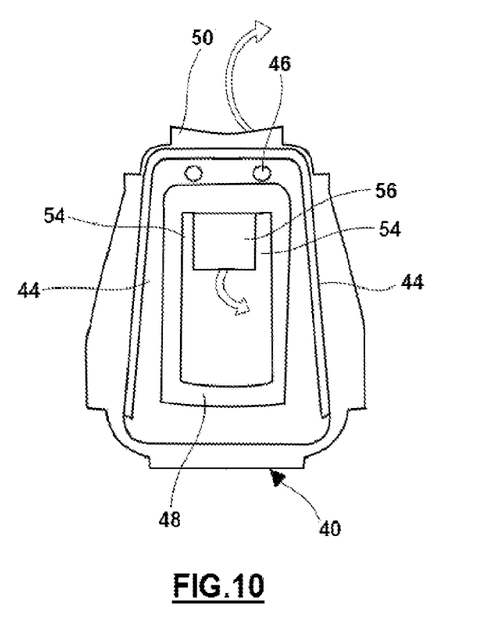
FIG. 10 is another front view of the exemplary back frame and showing the direction of bending of the first and second flanges.
Figure 11:
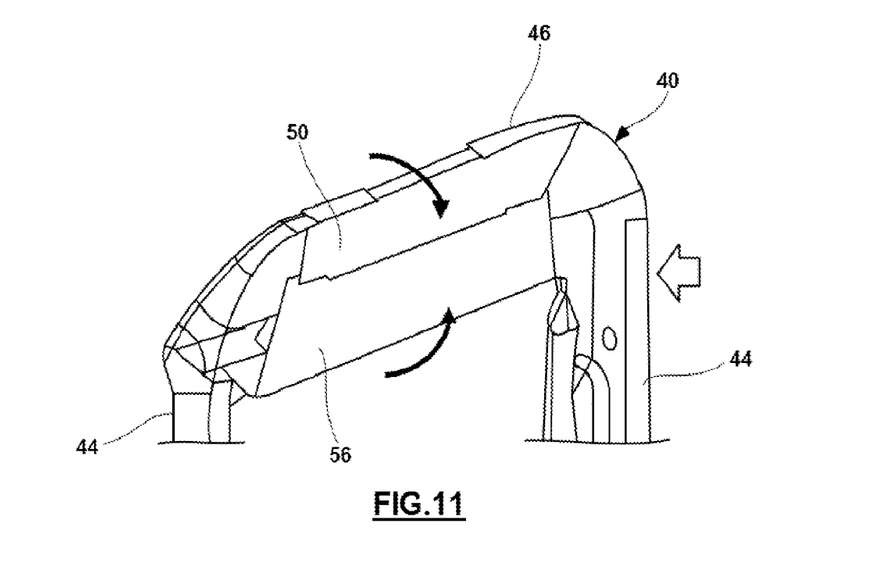
FIG. 11 is a perspective and fragmentary view of an upper portion of the exemplary back frame.

As indicated with arrows in FIGS. 10 and 11, the method continues with the step of bending the first and second flanges 50, 56 backwardly to enclose the upper portion 46 of the back frame 40. Next, the method proceeds with the step of securing the first and second flanges 50, 56 to one another. The first and second flanges 50, 56 are preferably secured to one another through welding or brazing, but could alternately be secured to one another through fasteners, rivets, adhesives, etc.

The method proceeds with the step of forming a pair of holes 58 in the top of the upper portion 46 of the back frame 40 and a pair of holes 58 in the bottom of the upper portion 46 of the back frame 40. As will be discussed in further detail below, the holes 58 on the top of the upper portion 46 are preferably aligned with the holes 58 on the bottom of the upper portion 46. The holes 58 are preferably formed through a punching or cutting process. Alternately, the method could include the step of cutting a pair of H-shaped slits in the top of the upper portion 146 and bending the material at these slits to create the holes 158 and to present a pair of generally flat tabs 164 disposed on either side of each hole 158.

The method then continues with the steps of inserting a tube 62, 162 through the aligned holes 58, 158 and securing the tubes 62, 162 to the upper portion 46, 146. If the alternate method described above was followed, then the tubes 162 are preferably secured to the generally flat tabs 164. The tubes 62, 162 are preferably attached to the upper portion 46, 146 through welding or brazing, but could alternately be attached to the upper portion 46, 146 through any desirable method. It may also be desirable to connect the tubes 62, 162 to the upper portion 46, 146 with a mechanical lock in addition to a weld or a braze. Thus, the tubes 62, 162 would still be supported by the upper portion 46, 146 even if the weld and/or braze fails. As discussed above, in addition to holding a head restraint, the tubes 62, 162 also have the effect of strengthening the upper portion 46, 146 to forces that occur during front and rear impacts.

FIG. 21 shows a cross-sectional view of the upper section 46 of the back frame 40 that is applicable to either the embodiment with the edge holes 58 or the embodiment with the tab holes 60.

The foregoing invention has been described in accordance with the relevant legal standards, thus the description is exemplary rather than limiting in nature. Variations and modifications to the disclosed embodiment may become apparent to those skilled in the art and fall within the scope of the invention.

We claim:

1. A method of forming a back frame for a vehicle seat comprising the steps of:
providing a blank of a formable material;
shaping the blank to present an upper portion, a lower portion, a pair of vertical portions and a center portion all integrally connected together;
cutting the center portion to define a flange integrally connected to said upper portion and extending downwardly therefrom;
bending the flange to enclose the upper portion; and
securing the flange to another portion of the upper portion.

2. The method as set forth in claim 1 wherein before said bending step, the upper portion includes a first flange extending outwardly from the upper portion away from the center portion and the second flange is formed from a material of the center portion and wherein said bending step is further defined as bending the first and second flanges toward one another and wherein said securing step is further defined as securing the first flange to the second flange.

3. The method as set forth in claim 2 further including the step of welding or brazing the flanges to one another.

4. The method as set forth in claim 1 wherein said step of cutting the center portion is further defined as cutting a pair of spaced and generally parallel slits in the center portion to define the flange.

5. The method as set forth in claim 4 further including the step of removing the non-flange area of the center portion.

6. The method as set forth in claim 1 further including the step of forming at least one hole in the top of the upper portion and at least one hole in the bottom of the upper portion and wherein the holes are aligned with one another.

7. The method as set forth in claim 6 wherein said step of forming a pair of holes in the upper portion is further defined as cutting H-shaped slits into the upper portion and bending the upper portion at the slits to present a pair of generally flat tabs.

8. The method as set forth in claim 7 further including the steps of inserting a tube into the aligned holes in the upper section and attaching the tubes to the generally flat tabs.

9. The method as set forth in claim 8 where the step of attaching the tubes to the generally flat tabs is further defined as welding or brazing the tubes to the generally flat tabs.

\* \* \* \* \*